Nov. 29, 1966  KOICHIRO SAIKI  3,288,050
ADJUSTABLE GRILL
Filed July 9, 1964  2 Sheets-Sheet 1
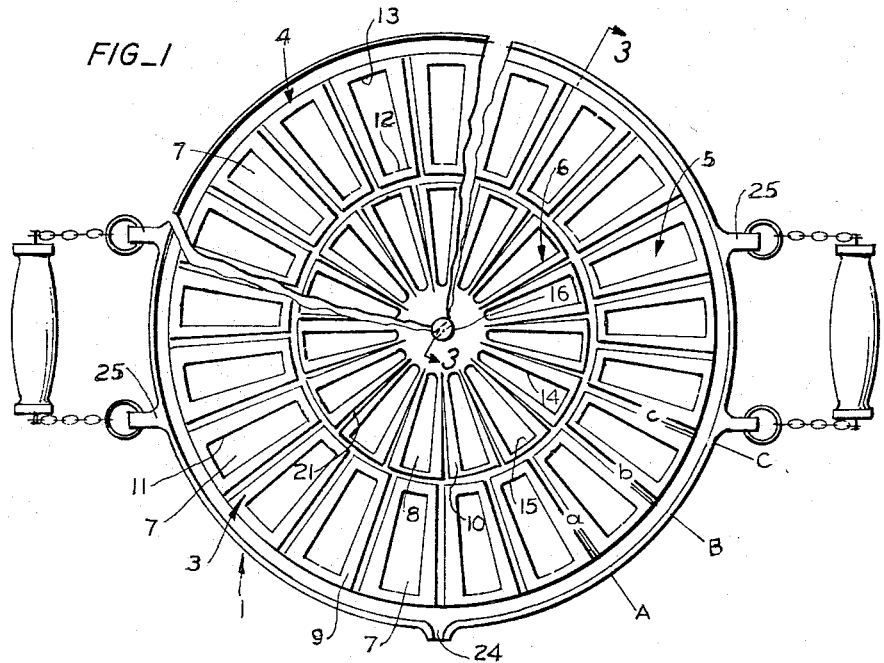
FIG_1
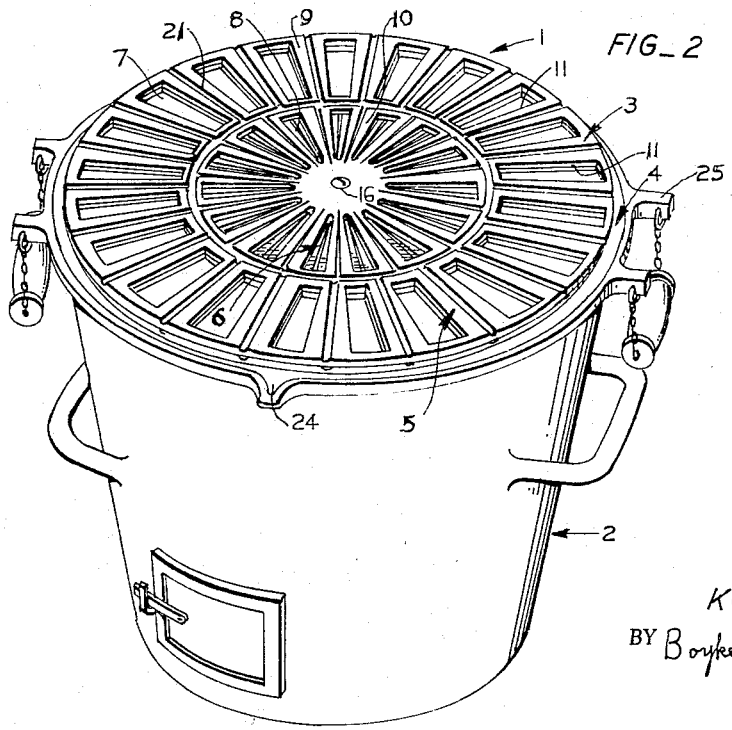
FIG_2
INVENTOR.
KOICHIRO SAIKI
BY Boyken, Mohler & Foster
ATTORNEYS

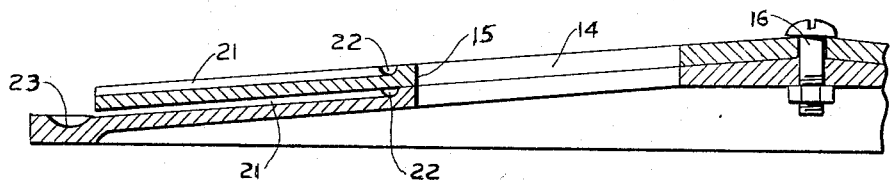
FIG_3
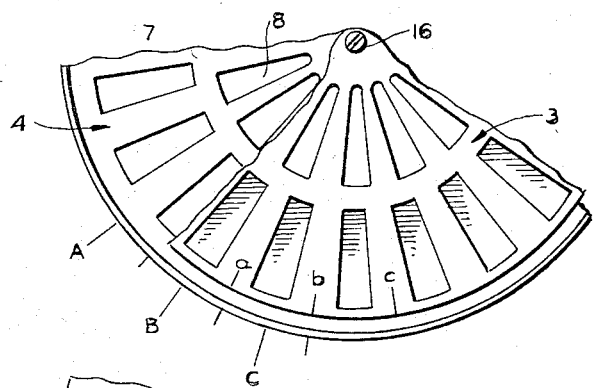
FIG_4A
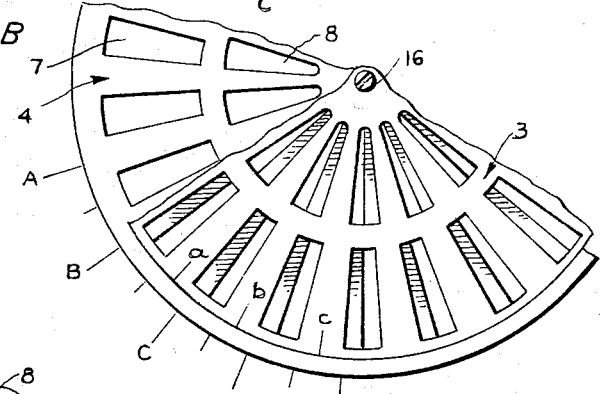
FIG_4B
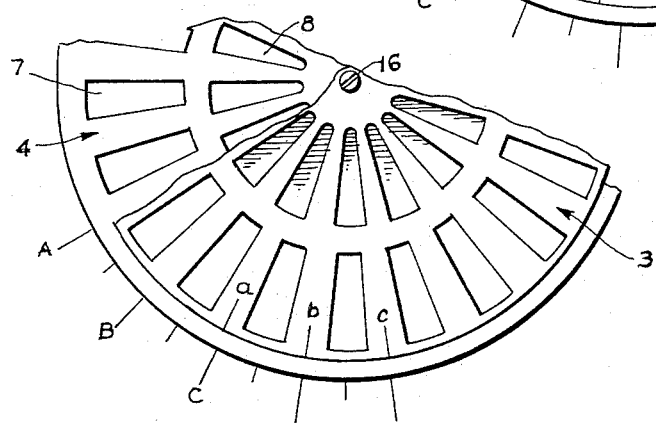
FIG_4C
INVENTOR.
KOICHIRO SAIKI
BY Boyken, Mohler & Foster
ATTORNEYS

United States Patent Office 3,288,050
Patented Nov. 29, 1966

3,288,050
ADJUSTABLE GRILL
Koichiro Saiki, 2202 Akahori, Yokkaichi
Mie Prefecture, Japan
Filed July 9, 1964, Ser. No. 381,488
6 Claims. (Cl. 99—447)

This invention relates generally to cooking grills and more particularly to an improved grill having openings and closure portions adjustable relatively for occluding said openings with said portions to various degrees.

The present grill is particularly well suited for use with a hibachi or similar fire pot upon which it may be removably mounted. The grill provides a surface upon which food may be placed for cooking and at the same time provides means for controlling the heat applied to the particular food being cooked. It is to be understood that the term "grill" as herein employed refers to the food supporting elements and not to the complete cooking utensil. The present grill may be simply adjusted to direct heat through a particular portion of the grill or to change the nature of application of heat to food placed thereon. For example, the heat may be diffused or localized as desired. A similar adjustment may cause the application of the heat to differ over specific portions of the grill, for example, to be diffused at the periphery of the grill and localized at the central portion. Grills heretofore employed do not permit this type of adjustment.

Accordingly, it is an object of the present invention to provide a simply constructed, easily adjustable grill which is capable of an extremely high degree of control of heat passed therethrough.

Another object of the present invention is to provide an adjustable grill including members each having rows of openings which function as heat passages and which may be occluded to different degrees for controlling passage of heat therethrough. A still further object is to provide a grill in which the degree of occlusion of openings may be made to differ between rows of apertures.

Yet another object is to provide an adjustable grill in which the difference in degree of occlusion of openings between different rows of openings may be made to vary.

The invention possesses other objects and features of advantage some of which, with the foregoing, will be set forth in the following description of the preferred form of the invention which is illustrated in the drawings accompanying and forming part of this specification. It is to be understood that variations in the showing made by said drawings and description may be adopted within the scope of the invention as set forth in the claims.

In the drawings:

FIG. 1 is a top plan view of the preferred form of the adjustable grill shown in the fully opened position, with a portion of the upper plate broken away to expose the base plate.

FIG. 2 is a perspective view of the preferred form of the present grill mounted upon a conventional fire pot.

FIG. 3 is a sectional view taken along line 3—3 of FIG. 1.

FIG. 4A is a fragmentary plan view of a portion of the preferred embodiment of the present grill illustrating a position in which the peripheral openings thereof are occluded while the central openings are unobstructed.

FIG. 4B illustrates another position of the apparatus of FIG. 4A in which both peripheral openings and central openings are partially occluded.

FIG. 4C illustrates a further position of the apparatus of FIG. 4A in which the peripheral openings are unobstructed while the central openings are fully occluded.

In detail, a preferred embodiment of the present invention comprises a generally flat grill 1 (FIGS. 1 and 2) of a type adapted for removable mounting upon a conventional fire pot or hibachi 2. Grill 1 is disposed across the top of pot 2 supported at its periphery thereby, providing an upper surface upon which food may be placed for cooking and means for controlling application of heat generated in said pot to said food. Handles provided on opposite ends of grill 1 facilitate removeal for cleaning said grill and for access to the interior of pot 2.

Grill 1 includes a circular, generally flat upper member or plate 3 and a substantially similar but slightly larger lower or base plate 4 carrying said plate 3 and supported circumferentially by the brim of pot 2.

Each plate 3 and 4 includes a pair of concentrically related portions 5 and 6. Peripheral portion 5 is formed with an annular row of regularly spaced openings 7 which have intervening plate portions therebetween defining webs 9 which serve as closure portions as will hereinafter be described. Central portion 6 is similarly formed with an annular row of regularly spaced openings 8 with webs 10 therebetween.

Openings 7 are elongated radially of plates 3 and 4. Each has radially extending side edges 11 and an arcuate inner end 12 and outer end 13, the arcs of which are concentric with the perimeter of circular plates 3 and 4. Webs 9 extending between said openings have substantially the width of the openings being only slightly wider.

Each radially elongated opening 8 has radially extending side edges 14 which describe an angle slightly greater than that described by edges 11 of openings 7, and arcuate outer ends 15 the arcs of which are concentric with the arcs of ends 12 and 13. Webs 10 are slightly wider than openings 8. Openings 7 are greater in number than openings 8 (FIG. 1), and the relative disposition between openings 7 in the peripheral row and openings 8 in the central row is such that some pairs of openings 7, 8 are radially aligned while others are offset radially.

Connecting means such as a bolt 16 extends through the center of superposed plates 3 and 4 providing a pivot for rotation of plate 3 relative to stationary base plate 4 upon which it lies, plate 4 being itself supported on pot 2. Thus, there is provided means for supporting said plates for movement relative to each other with rows of openings 7, 8 of the upper plate superposed over corresponding rows of the lower plate. In the circular embodiment of the grill described herein the movement is rotative and so occurs in the direction longitudinally of the parallel rows of elements, which elements consist of alternately disposed openings 7, 8 and intervening grill portions or webs 9, 10.

The present grill furnishes means for accomplishing an extremely high degree of control of heat passed therethrough to foods placed thereon for cooking. Openings 7 and 8 on plates 3 and 4 provide passages for direct flow of heat through grill 1. When plates 3 and 4 are disposed with openings 7 and 8 of one plate in full registration with the opening of the other, maximum direct heat flow occurs through both peripheral portion 5 and central portion 6. Rotation of plate 3 relative to plate 4 from a fully registered position causes the openings to move out of registration so that webs or closure portions 9 and 10 on one plate occlude to some degree openings 7 and 8 respectively on the other plate. Thus, it may be said that the effective opening may be varied, where the term "effective opening" refers to the portion of an opening 7, 8 which is not obstructed by a web 9, 10. An effective opening of zero occurs when the opening 7, 8 is completely occluded by web 9, 10. The amount of direct flow of heat through an opening is thus controlled through rotation of plate 3 relative to plate 4 to vary the degree of occlusion of an opening by a web portion disposed thereacross. Forming the openings with radial side edges and arcuate ends results in the openings being occluded to the same extent along their full length.

As plate 3 is further rotated from the fully registered position the degree of occlusion of openings 7 in the peripheral row is seen to differ from the degree of occlusion of openings 8 in the central row. Furthermore, this difference in degree varies as the relative position of plates 3 and 4 changes with rotation. For example, rotation to one relative position of plates 3 and 4 may effect complete occlusion of the peripheral openings 7 with full registration of centarl openings 8, while rotation to another relative position may effect complete occlusion of both peripheral and central openings. The grill, through rotation of plate 3 through various angles, permits of innumerable variations in difference in degree of occlusion between the rows so that heat may be directed in either a localized or diffused pattern through the desired portion of the grill. This versatility results from the configuration of openings 7 and 8 in which openings 7 differ in number from openings 8.

A typical pattern of apertures on a plate (FIG. 1) may include twenty-one peripheral openings 7 and fifteen central openings 8. Disposition of openings between rows is fixed by radially aligning a peripheral opening $7^1$ with a central opening $8^1$ (FIG. 1). With the combination of twenty-one peripheral and fifteen central openings as shown, radial alignment of one pair of openings $7^1$ and $8^1$ produces radial alignment of pairs of openings at each 120 degrees. The openings 7 and 8 between aligned pairs are in different degrees of radial offset with the same amount of offset occurring each 120 degrees. Therefore, the plates may be said to be divided into three similar sectors each including seven peripheral openings 7 and five central openings 8.

In FIG. 1 the plates 3 and 4 are positioned so that all openings are in full registration. The grill is fully open and allows maximum direct heat to pass through the peripheral and central portions. Lower case letters "a," "b," and "c," and associated capital letters "A," "B," and "C," included in FIG. 1 and FIGS. 4A, 4B and 4C, represent individual points on plates 3 and 4 for indicating the relative position thereof. The letters are included herein to facilitate illustration of the effect of relative rotation of the plates and otherwise have no function. The distance of separation of the points is equivalent to an amount of rotation of plate 3 necessary to bring an opening 7 thereof out of registration with one opening 7 of plate 4 and into registration with an adjacent opening 7 thereof.

FIG. 4A shows the relative position of plates 3 and 4 as a result of counterclockwise rotation of plate 3 from the FIG. 1 position so that points "a" is moved into alignment with a point on plate 4 midway between points "B" and "C." In this position the peripheral openings on plate 3 are fully occluded while the central openings are unobstructed. Further, rotation of plate 3 to a position in which point "a" is in alignment with a point on plate 4 three-quarters of the distance from point "B" to point "C" (FIG. 4B) produces occlusion of one half of both the peripheral and central openings of plate 3 by the webs of plate 4. FIG. 4C shows the relative position in which point "a" has been moved into alignment with point "C" producing complete occlusion of the central openings of plate 3 while the peripheral openings thereof are completely unobstructed. As can be appreciated, plate 3 may be rotated any desired amount to produce desired occlusion of the openings of both rows for optimum cooking conditions.

Plates 3 and 4, which may be of cast iron, are slightly conical with upper apices and are provided with grooves 21 (FIGS. 1–3) formed in the top surface thereof, and which extend radially centrally of webs 9 and 10, and join with annular grooves 22 disposed medially of the plates. Plate 4 is provided with an additional annular groove 23 at its perimeter which joins with the radial grooves thereof. Grease produced during the cooking process may flow through the grooves 21, 22 and 23, directed outwardly from the centers of plates 3 and 4 by the downward inclination of the plates. Plate 4 has a slightly larger radius than does plate 3 so that the grease may spill off the edge of plate 3 into groove 23 and pour into a receptacle (not shown) through spout 24. Pairs of lugs 25 may be formed at opposite ends of grill 1 for mounting handles to facilitate removal of the grill from pot 2.

While one embodiment of the present grill has been described in detail it is to be understood that the claims appended hereto are intended to cover all changes and modifications of the example of the invention herein chosen for purposes of the disclosure which do not constitute departures from the spirit and scope of the invention. For example, a rectangular grill may be formed with parallel linear rows of openings, and means connecting the plates for relative movement may be provided peripherally rather than centrally.

I claim:
1. An adjustable grill, comprising:
   (a) a pair of plates in face to face engagement and superposed relation providing an upper plate and a lower plate;
   (b) said pair of plates each being formed with a pair of parallel rows of equally spaced openings and intervening grill portions respectively between the adjacent pairs of openings in each row with said intervening portions being of substantially the same width as each of the openings of each of said adjacent pairs in a direction longitudinally of each row and the rows of openings in said upper plate being superposed relative to the rows of openings in said lower plate, whereby upon movement of one plate relative to the other longitudinally of said rows, the intervening portion between each adjacent pair of openings in each row of openings may move to a position in which the respective openings in said rows will be fully closed;
   (c) the openings in one corresponding row in each plate being different in number than the number of openings in the other corresponding row in each plate with the difference in number being such that in a first position of said plates relative to each other all of the openings in one plate will be closed by said intervening portions of the other plate, and in a second position all of the openings in both plates will be substantially fully open and in other positions of said plates relative to each other in said direction the effective openings in the pair of rows in each plate will vary relative to each other and relative to said first and second positions; and
   (d) means supporting said plates for movement relative to each other in said direction through all of said positions.
2. The device of claim 1, in which:
   (e) said openings in said one corresponding row in each said plate are different in extent in said direction than said openings in said other corresponding row in each said plate.
3. An adjustable grill, comprising:
   (a) a pair of plates in face to face engagement and superposed relation providing an upper plate and a lower plate;
   (b) said pair of plates each being formed with a pair of concentric rows of equally spaced openings and intervening grill portions respectively between the adjacent pairs of openings providing an inner row and an outer row thereof with said intervening portions being of substantially the same width as each of the openings of each of said adjacent pairs in a direction longitudinally of each row and the inner and outer rows of openings in said upper plate being superposed respectively relative to the inner and outer rows of openings in said lower plate, whereby upon rotation of one plate relative to the other in said direction the intervening portion between each adjacent pair of openings may move to a position in which the respective openings in said rows will be fully closed;

(c) the openings in said inner row in each plate being different in number than the number of openings in said outer row in each plate with the difference in number being such that in a first position of said plates relative to each other all of the openings in one plate will be closed by said intervening portions of the other plate, and in a second position all of the openings in both plates will be substantially fully open and in other positions of said plates relative to each other in said direction the effective openings in the pair of rows in each plate will vary relative to each other and relative to said first and second positions; and (d) means supporting said plates for rotation relative to each other through all of said positions.

4. The device of claim 3, in which:

(e) said openings in said inner row in each said plate are different in extent in said direction than said openings in said outer row in each said plate.

5. The device of claim 4, in which:

(f) said openings in said outer row in each said plate are greater in number than said openings in said inner row in each said plate.

6. The device of claim 4, in which:

(f) said pair of plates are each slightly conical in shape with the upwardly directed apices being at the center thereof; and (g) a plurality of grooves are formed in the upper surface of each said plate extending from substantially said center and to the perimeter thereof.

References Cited by the Examiner

UNITED STATES PATENTS

| | | | |
|---|---|---|---|
| 1,471,039 | 10/1923 | Lee | 99—445 |
| 2,028,649 | 1/1936 | Conroy | 99—446 X |
| 2,985,097 | 5/1961 | Nevin et al. | 99—447 |

BILLY J. WILHITE, *Primary Examiner.*

S. P. FISHER, *Assistant Examiner.*